Patented Oct. 4, 1932

1,881,283

UNITED STATES PATENT OFFICE

HIRAM S. LUKENS, OF PHILADELPHIA, PENNSYLVANIA, ASSIGNOR TO SOLIDON PRODUCTS, INC., OF PHILADELPHIA, PENNSYLVANIA, A CORPORATION OF DELAWARE

MAGNESIUM OXIDE MIXTURES AND METHOD OF MAKING THE SAME

No Drawing.  Application filed June 1, 1931. Serial No. 541,536.

The object of this invention is to provide a controllable magnesia mixture, the setting time of which can be adjusted as desired and also to improve the strength of such cements.

I have discovered that in the reaction of magnesium oxide with magnesium salts to form the so-called magnesia cements, magnesium oxide dissolves in magnesium salt solutions and subsequently reprecipitates in combination with magnesium salts to form the cementitious material of the bond. The velocity of this reaction is definitely related to or determines the rate at which the cement will acquire a set. The velocity of this reaction is determined by the properties of the magnesium oxide.

I have further discovered that by preparing a mixture of magnesium oxide produced by calcination at a higher temperature with magnesium oxide produced by calcination of magnesium hydroxide at a lower temperature, a composition is provided having improved chemical and practical qualities including that of adjustable setting times. By properly proportioning the relative amounts of the two or more types of magnesium oxide in the mixture, I can prepare mixtures which will react chemically at different desirable velocities between the higher velocity of setting of oxide produced by low temperature calcination of the hydroxide and the lower velocity of oxide produced by high temperature calcination.

All compounds of magnesium which yield the oxide when calcined at a relatively low temperature, for example, 300° C. to 500° C., give a product which is extremely reactive chemically, such reaction occurring at relatively high velocity. For example, magnesium oxide produced by calcining tri-hydrated magnesium carbonate at 300° C. will react with water to form magnesium hydroxide with such velocity that the mixture becomes heated to a point aproaching the boiling point of water. Magnesium oxide produced by calcining between 600° C. and 800° C. only becomes completely hydrated in three days. On calcining magnesium oxide between 1000° C. and 1100° C., there is a further marked decrease in the rate of hydration. As an example of such properties, I give in the following table the results of calcining magnesium hydroxide at the temperatures indicated when treated with magnesium chloride solutions of 22° Bé. In each case, one gram samples of the oxide prepared by calcining magnesium hydroxide at the temperatures indicated were agitated in the thermostat at a temperature of 30° C. with 100 cc portions of magnesium chloride solutions of 22° Bé. Samples of the solutions were removed from time to time and subjected to analysis. The time required for saturation with magnesium oxide is a measure of the velocity of reaction with the magnesium chloride in each case.

| Temperature of calcination | Time in minutes required to complete saturation |
|---|---|
| °C. | |
| 400 | 90 |
| 700 | 105 |
| 800 | 150 |
| 900 | 270 |
| 1000 | 310 |

The fact that the velocity of the above reaction bears a definite relation to the rate at which cements of this type will acquire a set is shown by the following table wherein samples of magnesium oxide were gauged with magnesium chloride solution of 22° Bé. and kept at a temperature of 25° C. The initial and final sets were determined by the use of Gilmore needles.

| Temperature of calcination of $Mg(OH)_2$ | Initial set in minutes | Final set in minutes |
|---|---|---|
| °C. | | |
| 500 | 6 | 21 |
| 600 | 10 | 28 |
| 700 | 11 | 32 |
| 800 | 12 | 35 |
| 900 | 135 | 195 |

Following out my discovery of the different forms of oxides resulting from calcining hydrated magnesium oxide at different temperatures, I mixed in different proportions, given in the following table, magnesium oxide obtained by calcining magnesium hydroxide at 900° C. to 1000° C., with that obtained by calcining magnesium hydroxide at 300° C. to 400° C. In each case, portions of these two kinds of oxide were intimately mixed in the proportions indicated in the table and gauged with magnesium chloride solutions of 22° Bé., while keeping the samples at a temperature of 25° C. The initial and final sets were determined by the use of Gilmore needles.

| Oxide 900°-1000° | Oxide 300°-400° | Initial set in minutes | Final set in minutes |
|---|---|---|---|
| Per cent | Per cent | | |
| 100 | ---------- | 160 | 300 |
| 90 | 10 | 95 | 150 |
| 80 | 20 | 75 | 128 |
| 70 | 30 | 53 | 103 |
| 60 | 40 | 49 | 85 |
| 50 | 50 | 37 | 70 |
| ---------- | 100 | 5 | 18 |

Furthermore, the use of such mixtures of oxides not only regulates and changes the setting time, but also gives different results in tensile strengths of briquettes made therefrom, as indicated in the following table, wherein all other conditions were similar.

| Oxide 900°-1000° | Oxide 300°-400° | Tensile strength in pounds per square inch | | |
|---|---|---|---|---|
| | | 24 hours | 7 days | 28 days |
| Per cent | Per cent | | | |
| 100 | ---------- | 405 | 560 | 750 |
| 90 | 10 | 390 | 565 | 1000 |
| 80 | 20 | 375 | 625 | 900 |
| 70 | 30 | 440 | 600 | 925 |
| 60 | 40 | 475 | 570 | 750 |
| 50 | 50 | 450 | 485 | 670 |
| ---------- | 100 | 270 | 390 | 590 |

This table illustrates the variation in tensile strength, due to different proportions of mixtures of the two oxides; and proves that stronger cements are produced from mixtures of oxides than from single forms of oxides. It appears probable that the presence of that oxide which reacts with accelerated velocity catalyzes the reaction of the more inert oxide with other substances.

The mixtures of two or more forms of magnesium oxides may be produced in many different ways within the scope of my invention; and I do not limit myself to any specific way of producing such mixtures. For example, mixtures of different forms of oxides may be made by treating magnesium oxide, which has been calcined at a relatively higher temperature, with sufficient water to convert a definite percentage of such material to magnesium hydroxide. On subsequently calcining this product at a lower temperature than that at which the original oxide was prepared, a product results having properties similar to a mixture obtained by mechanically mixing the varieties of oxide corresponding to such respective temperatures of calcination.

In the following table, I treated magnesium oxide produced by calcination at 900° C. to 1000° C. with different proportions of water sufficient to convert the same in part to the respective percentages of magnesium oxide indicated in the table. The mixtures of oxide and hydroxide were then calcined at 500° C. The resultant samples of mixtures of the two varieties or forms of magnesium oxide were then made into samples with magnesium chloride solution of 22° Bé. and kept at a temperature of 25° C. while the rate of set was determined by Gilmore needles.

| Per cent of magnesium hydroxide present before calcining | Initial set in minutes | Final set in minutes |
|---|---|---|
| 17.3 | 78 | 123 |
| 18.7 | 58 | 102 |
| 19.5 | 64 | 103 |
| 21.4 | 52 | 102 |
| 22.4 | 37 | 85 |
| 46.4 | 8 | 18 |
| 55.8 | 9 | 23 |
| 62.2 | 6 | 19 |
| 64.7 | 3 | 12 |

In the above tables, discrepancies are well within the limits of experimental error, the general trend being clear.

Various other methods of preparing mixtures of the different forms or vorieties of magnesium oxide may be devised by those skilled in the art, and I do not limit myself to any particular method for preparing such mixtures.

The invention may be used with or without the addition of an aggregate such as sand, etc. For plastic use, the factors are preferably so handled that an initial set of less than sixty minutes and a final set of less than one hundred minues is obtined.

In factory made castings, the material may be used without aggregate or with a small percentage thereof to give a very short setting time.

In carrying out my process with commercial calcined magnesia, I preferably first test a sample of calcined and air-slaked magnesite to ascertain approximately the percentage of water contained or the percentage of magnesium hydroxide contained. Then I preferably controllably hydrate such material, if insufficiently hydrated, to a substantially definite percentage or amount. It may then be recalcined at a lower temperature to provide the two kinds or varieties of oxide.

Where aggregate is mixed with material prepared in accordance with this invention, in making the final mixture, I preferably employ the proportions of oxide mixture, magnesium chloride, water and aggregate, such as set forth in my copending application, Serial No. 406,560, filed November 12, 1929 (now Patent No. 1,811,799). In accordance with said invention, the mixture is made in such proportions that the amounts of magnesium oxide and magnesium chloride are within the ratio of one part by weight of magnesium oxide to about .84 to 1.25 parts by weight of $MgCl_2 6H_2O$, and the ratio of the amount of aggregate to the combined amounts of magnesium oxide and magnesium chloride is such that the amount of water required to produce therefrom a mix of the proper consistency for manipulation will not be in excess of that amount which would produce a solution of 16° Bé., if the amount of magnesium chloride in the mixture were dissolved therein. By the use of such proportions, a substantially uniform and stable product is obtained where heretofore such results have been variable and not reliable. The concentration of magnesium chloride may extend from 16° Bé. upward; different aggregates may be used or not within my broader claims, and other changes may be made without departing from my invention.

By the word "hydrated" in my claims, I intend to cover either wholly or partially hydrated material. My broader claims are not limited to controllable hydrating as commercial magnesium may be used, if it has become sufficiently hydrated after calcination.

This application is a continuation-in-part of my prior and copending applications, bearing Serial No. 353,267 filed April 6, 1929, and Serial No. 165,031, filed Jan. 31, 1927.

I claim:

1. As a new article of manufacture, a mixture of different forms of magnesium oxides, one form having the characteristics produced by calcination of a magnesium compound at a higher temperature and another form having the characteristics obtained by calcining magnesium hydroxide at a lower temperature.

2. As a new article of manufacture, a mixture of different forms of magnesium oxides, one form having the characteristics produced by calcining magnesium carbonate at a higher temperature and another form having the characteristics obtained by calcining magnesium hydroxide at a lower temperature.

3. As a new article of manufacture, a mixture of different forms of magnesium oxides and other materials, one form having the characteristics produced by calcination of a magnesium compound at a higher temperature and another form having the characteristics obtained by calcining magnesium hydroxide at a lower temperature.

4. In the method of preparing mixtures of different forms of magnesium oxides for plastic magnesium materials, the step consisting of calcining hydrated magnesium oxide at a lower temperature than the temperature at which the said magnesium oxide was formed by calcination of a magnesium compound.

5. In the method of preparing mixtures of different forms of magnesium oxides for plastic magnesium materials, the steps consisting of hydrating magnesium oxide obtained by calcination at a higher temperature, and then calcining the magnesium hydrate at a lower temperature than the temperature at which it was formed by calcination of a magnesium compound.

6. In the method of preparing mixtures of different forms of magnesium oxides for plastic magnesium materials, the steps consisting of controllably hydrating to a substantially definite percentage magnesium oxide obtained by calcination of a magnesium compound at a higher temperature, and then calcining the magnesium hydrate at a lower temperature than the temperature at which it was formed by calcination of a magnesium compound.

7. In the method of preparing mixtures of different forms of magnesium oxides for plastic magnesium materials, the steps consisting of partially hydrating magnesium oxide produced by calcining a magnesium compound at a higher temperature, and then calcining the mixture of magnesium oxide and magnesium hydroxide at a lower temperature than the temperature at which the magnesium oxide was formed by calcination of a magnesium compound.

8. In the method of preparing mixtures of different forms of magnesium oxides for plastic magnesium materials, the step consisting of mixing magnesium oxide formed by high temperature calcination of a magnesium compound with magnesium oxide formed by hydrating magnesium oxide and calcining the resulting hydroxide at a relatively lower temperature.

9. In the method of preparing mixtures of different forms of magnesium oxides for plastic magnesium materials, the steps consisting of hydrating magnesium oxide obtained by relatively high temperature calcination of a magnesium compound, dividing the said hydrated material into different portions, calcining one portion at a high temperature, calcining the other portion at a low temperature, and mixing the different forms of magnesium oxides thus produced.

10. In the method of preparing mixtures of different forms of magnesium oxides for plastic magnesium materials, the step consisting of mixing an aggregate with two forms of magnesium oxides, one produced by calcination of a magnesium compound at a higher temperature and another produced by calination of magnesium hydroxide at a lower temperature.

11. In the preparation of plastic magnesium materials, the process consisting in mixing a plurality of forms of magnesium oxide, one form produced by calination of a magnesium compound at a higher temperature and another form produced by calcination of magnesium hydrate at a lower temperature, with magnesium chloride and aggregate in such proportions that the amounts of magnesium oxide and magnesium chloride are within the ratio of one part by weight of magnesium oxide to form about .84 to 1.25 parts by weight of $MgCl_2 6H_2O$, and the ratio of the amount of aggregate to the combined amounts of magnesium oxide and magnesium chloride is such that the amount of water required to produce therefrom a mix of proper consistency for manipulation will not be in excess of that amount which would favor the combination of all of the magnesium chloride with all of the magnesium oxide initially available for reaction.

12. In the preparation of plastic magnesia materials, the steps consisting of hydrating magnesia obtained by calcining magnesite at a normal calcining temperature, and then calcining the hydrated magnesia at a temperature below 800° C.

13. In the preparation of plastic magnesia materials, the steps consisting of controllably hydrating to a substantially definite percentage magnesia obtained by calcining magnesite at a normal calcining temperature, and then calcining the hydrated magnesia at a temperature below 800° C.

14. In the preparation of plastic magnesia materials, the steps consisting of calcining at a temperature below normal calcining temperature and below 800° C. hydrated magnesia produced by calcining magnesite at the normal calcining temperature.

15. In the preparation of plastic magnesia materials, the steps consisting of hydrating magnesia obtained by calcining magnesite at a normal calcining temperature, then calcining the hydrated magnesia at a temperature below the original normal calcining temperature, and mixing it with a magnesium chloride solution of less than 30° Bé.

16. In the preparation of plastic magnesia materials, the steps consisting of hydrating magnesia obtained by calcining magnesite at a normal calcining temperature, then calcining the hydrated magnesia at a temperature below the original normal calcining temperature, and mixing it and an aggregate with a magnesium chloride solution of less than 30° Bé.

17. As a new article of manufacture, a mixture of different forms of oxides of magnesium of different setting times, one of the oxides having the characteristics obtained by calcining magnesium hydrate at a temperature below 800° C.

18. As a new article of manufacture, a mixture of different forms of oxides of magnesium of different setting times, one of the oxides having the characteristics imparted by calcining $Mg(OH)_2$ at a temperature below 800° C.

In testimony whereof I have hereunto set my hand.

HIRAM S. LUKENS.

CERTIFICATE OF CORRECTION.

Patent No. 1,881,283.  October 4, 1932.

HIRAM S. LUKENS.

It is hereby certified that error appears in the printed specification of the above numbered patent requiring correction as follows: Page 3, line 106, claim 8, strike out the word "relatively"; and that the said Letters Patent should be read with this correction therein that the same may conform to the record of the case in the Patent Office.

Signed and sealed this 13th day of December A. D. 1932.

M. J. Moore,
Acting Commissioner of Patents.

(Seal)